United States Patent
Brand et al.

(10) Patent No.: US 7,822,029 B2
(45) Date of Patent: Oct. 26, 2010

(54) METHOD FOR ROUTING PACKETS IN AD-HOC NETWORKS WITH PARTIAL CHANNEL STATE INFORMATION

(75) Inventors: Matthew Brand, Newton, MA (US); Andreas F. Molisch, Pasadena, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 77 days.

(21) Appl. No.: 12/271,200

(22) Filed: Nov. 14, 2008

(65) Prior Publication Data

US 2010/0124219 A1     May 20, 2010

(51) Int. Cl.
*H04L 12/56* (2006.01)
(52) U.S. Cl. .................. 370/389; 370/238; 370/252; 370/315; 701/202
(58) Field of Classification Search ................. 370/315, 370/252, 238; 701/202
See application file for complete search history.

(56) References Cited

U.S. PATENT DOCUMENTS

| | | | | |
|---|---|---|---|---|
| 6,363,319 B1 * | 3/2002 | Hsu | ............................. | 701/202 |
| 2003/0227877 A1 * | 12/2003 | Kar et al. | ...................... | 370/252 |
| 2008/0225774 A1 * | 9/2008 | Kim et al. | ..................... | 370/315 |
| 2009/0052327 A1 * | 2/2009 | Larsson et al. | ............... | 370/238 |

OTHER PUBLICATIONS

Yu, Yang et al. "Energy Minimization for Real-Time Data Gathering in Wireless Sensor Networks," IEEE Transactions on Wireless Communications, vol. 5, No. 11 Nov. 2006.
Cruz, Rene L. et al. "Optimal Link Scheduling and Power Control in CDMA Multihop Wireless Networks," IEEE 2002; 0-7803-7632-3/02/.
Berry, Randall A. "Communication Over Fading Channels with Delay Constraints" IEEE Transactions on Information Theory, vol. 48, No. 5, May 2002.

* cited by examiner

*Primary Examiner*—Man Phan
*Assistant Examiner*—Mohamed Kamara
(74) *Attorney, Agent, or Firm*—Dirk Brinkman; Gene Vinokur (57) ABSTRACT

A method routes a packet from a source node, via relay nodes, to a destination node. The nodes are connected by wireless links x. A channel power gain $\gamma$ is measured for each link x. Resource trade-off curves $y = f(x)$ are constructed for each link x from the channel power gains $\gamma$, wherein y represents a set of resources. A hyperbolic upper bound $h/x+c$ is fitted to each resource curve, such that $h/x+c \geq f(x)$, wherein h is a scale factor, and c is an offset. A route with an optimal resource allocation is selected according to the hyperbolic upper bounds. Then, the packet is transmitted from the source node to the destination node using the route.

6 Claims, 5 Drawing Sheets

METHOD FOR ROUTING PACKETS IN AD-HOC NETWORKS WITH PARTIAL CHANNEL STATE INFORMATION

FIELD OF THE INVENTION

This invention relates generally to wireless ad hoc networks, and more particularly to resource allocation while routing messages.

BACKGROUND OF THE INVENTION

Unlike conventional wireless networks, such as cellular networks, ad-hoc networks do not have an infrastructure. Typically, ad-hoc networks use a large number of low complexity transceivers (nodes) to communicate information among each other. This approach not only decreases cost, but also decreases sensitivity to failure of a single link. This makes ad-hoc networks very promising for applications that require ultra-reliable communications links.

Highly reliable ad-hoc wireless networks have two contradictory constraints. The energy consumption has to be low, because the nodes are battery operated, and exhausting the battery can lead to failure. On the other hand, the probability for successful transmission of data should be very high. That is, a packet of data is to be transmitted from a source node to a destination node within a predetermined delay.

In ad-hoc networks, it is desired to select a route, i.e., a sequence of nodes, that passes the packet to the destination within a delay constraint, while minimizing energy. A simple solution uses a physical-layer transmission with a fixed packet size and coding rate, chosen so that that each link simply attempts to transmits a packet within a fixed span of time. Then, meeting the delay constraint is equivalent to limiting the number of hops.

However, this simple approach ignores the possibility of decreasing the overall delay by using more energy on certain links, and, possibly less on others. For a single link, the trade-off between transmission time and energy is straightforward. According to the Shannon's capacity equation, the possible data rate increases logarithmically with the transmit power. However, for networks with multiple hops, the trade-off becomes much more complicated. It involves selecting a route and then an energy level for each hop along the route.

In a unicast network of N nodes, each nodes can trade-off transmission power and transmission time using adaptive modulation and coding (AMC). A transmission is only considered successful if the packet arrives at the destination within the delay constraint. It is desired select a route and a per-hop energy assignment that minimizes the overall energy expenditure while at the same time enabling a probability of successful transmission of q, where q is in the range of 90, 99.999%.

Typically, only statistics of the channel state information (CSI) are available for the routing because the CSI is dynamic in ad-hoc networks. The coherence times of wireless propagation channels, i.e., the required update interval, is on the order of a few milliseconds. Frequently updating the CSI throughout the network would lead to unacceptable overhead. In large networks, the overhead traffic communicating the routing information for all possible links would decrease spectral efficiency and battery lifetime. On the other hand, on-demand route discovery is not feasible because the route discovery process often takes longer than the delay constraint.

Thus, the problem is well defined and practically relevant, but extremely hard to solve. There are on the order of N! possible routes in a network of N nodes, and for each route, the transmit energies of the nodes has to be optimized under probabilistic constraints.

One method considers delay constraints, but only with respect to scheduling on a single link, Berry et al., "Communication over fading channels with delay constraints," IEEE Transactions on Information Theory, vol. 48, pp. 1135-1149, 2002. Other methods consider energy/delay trade-off, but again only on a single link, Zhong et al., "Delay-constrained energy-efficient wireless packet scheduling with QoS guarantees," and Yang et al., "Energy minimization for real-time data gathering in wireless sensor networks," in IEEE Trans. Wireless Communications, vol. 5, 2006.

A number of methods consider joint routing and power control, but under the assumption of instantaneous CSI, and without delay constraints, Cruz et al. "Optimal link scheduling and power control in CDMA multihop wireless networks," IEEE Globecom, 2002. Another method considers routing with probabilistic delay constraints, but assumes fixed transmit power for each node, and convex bounds, U.S. patent application, Ser. No. filed by Brand, et al., on

SUMMARY OF THE INVENTION

The embodiments of the invention provide a method for routing a packet from a source node to a destination node in a wireless ad-hoc network while minimizing energy under a delay constraint, or minimizing delay under an energy constraint. Given channel state information (CSI), the method provides a tight hyperbolic bounds on the resources of interest, and solves the related optimizations.

If only the average CSI is available, then a probabilistical performance can be attained. Another set of bounds supports resource-optimal routing with a guaranteed success probability.

DETAILED DESCRIPTION OF THE PREFERRED EMBODIMENTS

Figure 1:
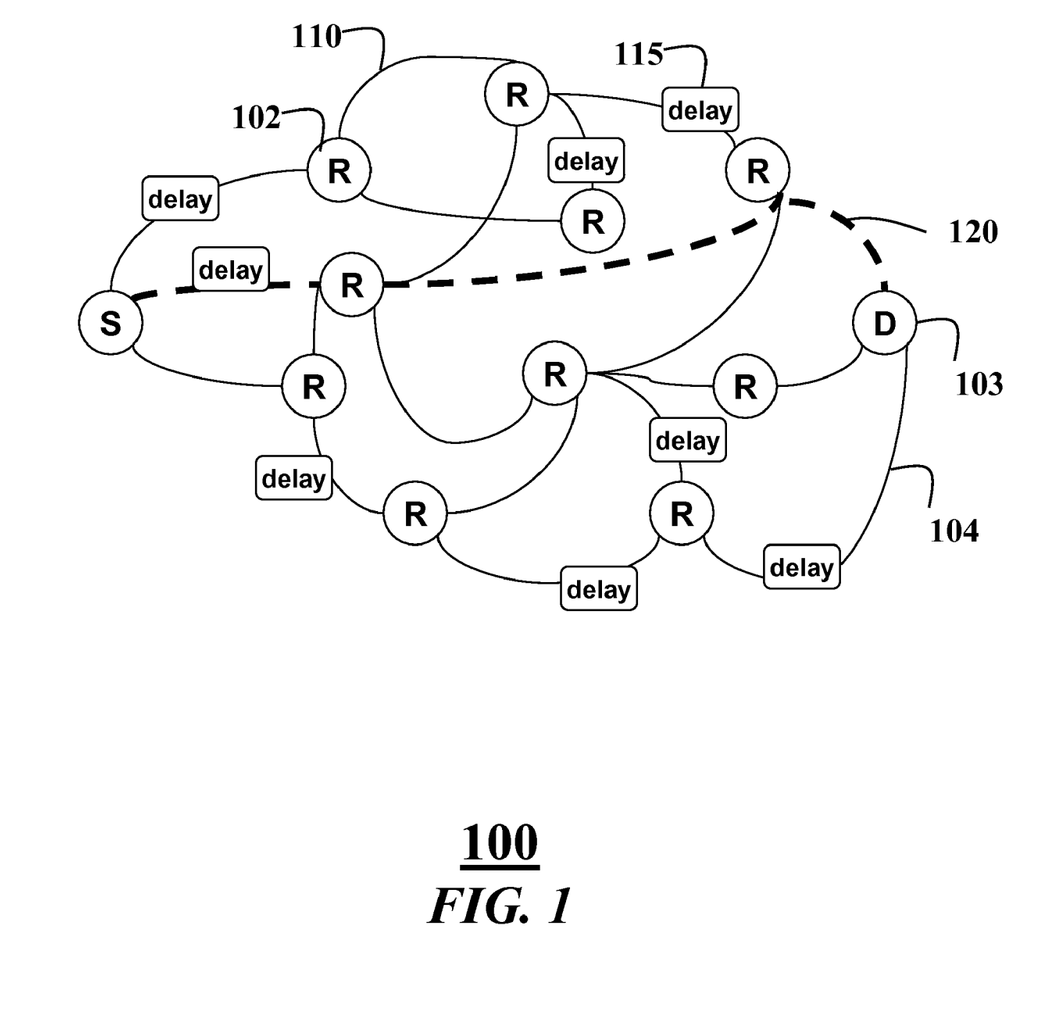
FIG. 1 is a schematic of a relay network according to embodiments of the invention with a source-to-destination route highlighted.
Figure 2A:
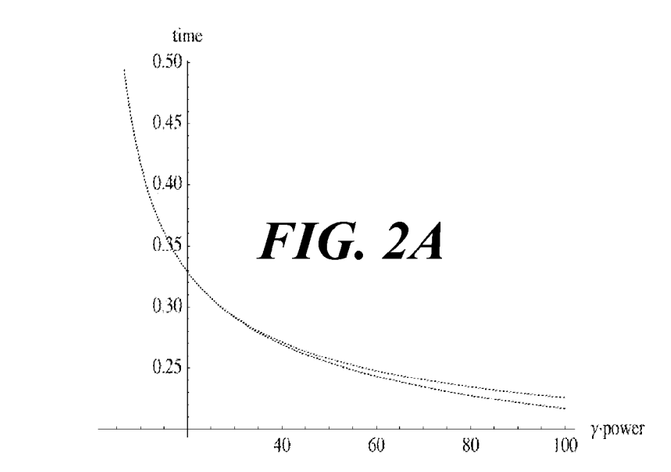
FIGS. 2A-2D are graphs of four types of resource, time versus power, time versus energy, and power versus time, and energy versus time with hyperbolic upper bounds.
Figure 2B:
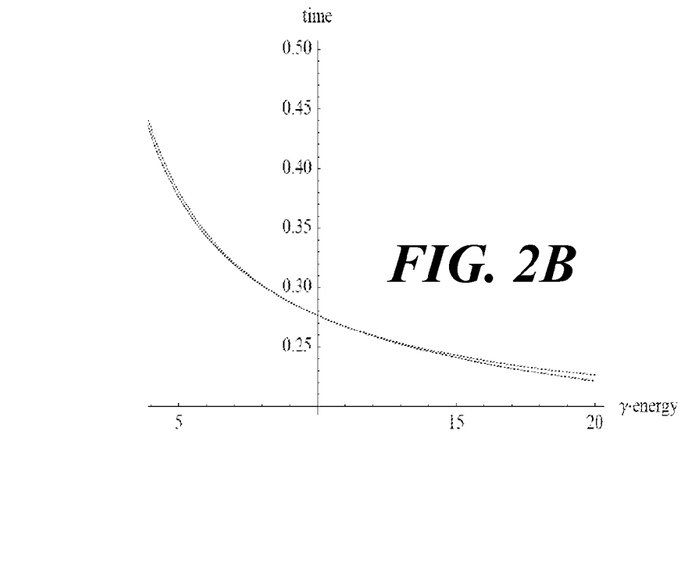
Figure 2C:
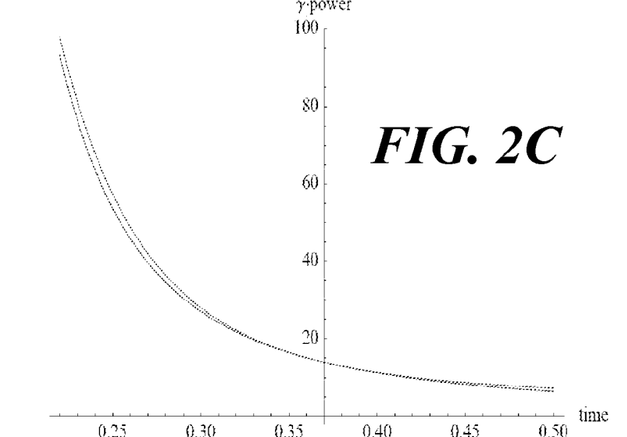
Figure 2D:
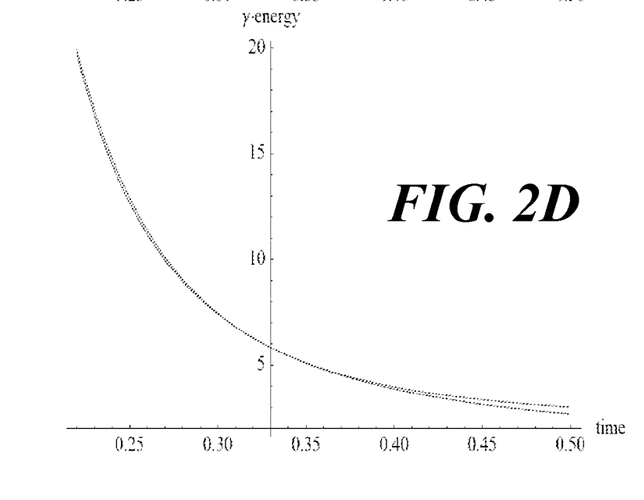

FIG. 1 shows a relay network according to embodiments of our invention. The network includes a source node 101, relay nodes 102, and a destination node 103. The nodes can be transceiver. The edges between the nodes represent channels 110. An optimal route 120 is indicated by a dashed line.

We focus our attention on the delays 115 in the channels. The delays can be due to a reliability of the channels connecting the nodes. The reliability, in part, is due to the channel gain or transmit power. Because measuring the instantaneous channel gain can take time, we use a measure of average gain. The gain is determined from channel state information (CSI).

The CSI directly affects the data rate that can be used to deliver packets. On a noisy or unreliable channel, packets may need to be retransmitted repeatedly, at a lower data rate, with more lengthy error-correcting codes. This increases latencies (delays). In our communication network, queuing delays at the nodes are ignored.

Network Model

From the Shannon capacity equation, the transmission time (delay), in seconds per nat (logarithmic unit of information or entropy) on a 1 Hz bandwidth additive white Gaussian noise (AWGN) channel and link capacity is $$t = \log(1+p\gamma)^{-1}, \quad (1)$$

where p is the power (normalized by the noise power) and $\gamma$ is the channel power gain, or inverse attenuation. As used herein, power is the rate at which energy is transmitted, or the amount of energy expended for a given unit of time.

Transmission time scales linearly with nats/bandwidth so all formula herein are on a per-nat/Hz basis. The inverse, $$p = (\exp(1/t) - 1)/\gamma, \quad (2)$$

gives the power needed for a desired transmission time, with the energy expenditure $$e = pt = t(\exp(1/t) - 1)/\gamma, \quad (3)$$

is no less than $1/\gamma$, because $\lim_{t \to \infty} e = 1/\gamma$.

Conversely, consuming $e \geq 1/\gamma$ energy units yields a transmission time of $$t = (-1/\gamma e - W_{-1}(-1/\gamma e \exp{-1/\gamma e}))^{-1}$$
$$< (\log \gamma e + \log(1 + \log \gamma e))^{-1} \quad (4)$$

seconds, where $W_{-1}(\bullet)$ is a branch of the multivalued Lambert W function that maps $[-\exp{-1}, 0) \to [-1, -\infty)$. This inequality is exact at $\gamma e = 1$, and a good approximation for $\gamma e > 1$.

These functions are convex decreasing on a positive line, specifying deeply "elbowed" resource trade-offs over the practical operating range of wireless nodes. For example, Equation (1) has a power-series approximation $$t \approx 1/p\gamma + \frac{1}{2}.$$

If one operates strictly in the subranges that lie on either side of the elbow (typically, high-bandwidth or low-SNR), linear approximations are useful. We provide a nonlinear solution for the entire resource trade-off curve we have constructed that is optimal or boundedly suboptimal.

Given an wireless channels or links $x_i$, each with a unique channel gain $\gamma_i$ and convex decreasing resource trade-off curves $y_i = f_i(x_i)$, we solve the following problems.

Allocation: Given a series of N links (hops) $x_i$ and a total (per-nat/Hz) budget B on a resource y, we find the allocation that minimizes a total use of the resources $$\min \sum_i f_i(x_i) \text{ such that } \sum_i x_i \leq B. \quad (5)$$

Routing: We select a route through a network that provides the optimal resource allocation.

Re-allocation: Given partial or other information, we determine the optimal allocation dynamically.

These deterministic optimizations are useful where channel state information (CS) remains valid long enough to be acted upon, i.e., the channel is slowly varying.

Stochastic Setting

In many networks, the instantaneous (CSI) can not be measurable or is not constant over a time scale of interest. Therefore, we work with a probability distribution over the CSI.

Instead of optimizing use of one resource subject to a constraint on another, (power/delay or delay/power) we minimize use of one resource subject to a bound on a probability of success in meeting the constraint on the other, i.e. Equation (5) is replaced with $$\min \sum_i y_i \text{ s.t. } Pr\left(\sum_i X_i \leq B\right) \geq q. \quad (6)$$

Here $y_i$ is a resource allocated to the $i^{th}$ link, $X_i$ is a random variable whose probability distribution function (PDF) is parameterized by the resource $y_i$, B is a budget, and q is a minimal acceptable probability of success.

Distributions Over Time and Power Costs

Stochasticity arises in practical networks because the channel gain is a random variable that is exponentially distributed with mean gain Solving Equation (2) for the gain $\gamma$ reveals that $(-1 + \exp 1/t)/p$ is exponentially distributed with parameter $\theta = 1/\bar{\gamma}$, while $p/(-1 + \exp 1/t)$ is inverse-gamma distributed with parameters $$\alpha = 1, \beta = 1/\bar{\gamma},$$

Solving for the conditional time and power cumulative distribution functions (CDFs) yields $$Pr(t \leq x \mid p) = \exp \frac{1 - \exp \frac{1}{x}}{p\bar{\gamma}}$$

$$Pr(p \leq x \mid t) = \Gamma\left(1, \frac{-1 + \exp \frac{1}{t}}{x\bar{\gamma}}\right) = \exp \frac{1 - \exp \frac{1}{t}}{x\bar{\gamma}}$$

where $$\Gamma(\alpha, b) \doteq \int_b^\infty t^{\alpha-1} e^{-t} dt$$

is the incomplete gamma function. These CDFs give the probability of meeting a time (or power) constraint given an expenditure of power (or time). Similarly, energy and time have the stochastic trade-off $$Pr(t \leq x \mid e) = \exp\{x(1 - \exp 1/x)/(e\bar{\gamma})\}$$

$$Pr(e \leq x \mid t) = \exp\{t(1 - \exp 1/t)/(x\bar{\gamma})\}.$$

These subexponential distributions have some unfavorable properties. They are more heavy-tailed than any distribution in the exponential family. They are not closed under convolution, so the sum of random variables in Equation (6) cannot be evaluated. They have infinite moments, so one cannot reason about expectations.

It is difficult, if not impossible, to analytically compare combinations of these distributions. Even the deterministic setting is challenging. On one hand, the allocation problem is a convex combination of convex functions, therefore in principle problem can be solved numerically through various convex optimization techniques.

However, the numerical effort is considerable and may require more time and energy than is being saved. To be useful, the solutions should be computationally simple and sufficiently accurate to be reliable in resource-limited networks.

To that end, we provide a set of tight upper resource trade-offs on the deterministic trade-offs. Then, we solve the resource trade-off allocation problems in closed form. This in turn yields a link characterization that supports near-optimal routing solutions in $O(M \log^2 M)$ time for a network of M links. We also transform the stochastic problem into a deterministic problem, which is solved.

Hyperbolic Resource Trade-Off

We start in a deterministic setting by upper resource bounding the resource trade-off curves $y=f(x)$ we have constructed for each link (channel) x over some finite practical range with a hyperbolic curve of a form $h_i/x^n{}_i+c_i$, for some global exponent $n>0$ and, for each link, a unique scale factor $h_i$ and offset $c_i$ for each link. The scaling and offset enable the curve fitting.

FIGS. 2A-2D show that as approximations to the deterministic resource trade-offs, these are quite good over a large operating range. FIGS. 2A-2D show four types of resource trade-offs, time versus power, time versus energy, power versus time, and energy versus time, with hyperbolic upper bounds. With a suitable choice of n, the expected approximation error can always be reduced to a few percent. Indeed, in many cases, we can analytically bound the maximum and expected error.

Usually, the maximum error can be bounded as well. Formally, we upper-bound a convex decreasing curve $y=f(x)$ with a hyperbolic curve $h/x^n+c$ on some interval $$[x_0, x_1], y \in [y_1=f(x_1), y_0=f(x_0)]$$

using one of four tactics:

We set the two curves to meet at endpoints $x_0$, $x_1$ with $$h = \frac{y_0 - y_1}{x_0^{-n} - x_1^{-n}}, c = \frac{y_1 x_1^n - x_0^n y_0}{x_1^n - x_0^n}, \quad (7)$$

selecting n small enough to guarantee an upper bound.

(B) We make the curves tangent at some point $x=\mu \in 2 [x_0, x_1]$ with $$h = -\mu^{n+1} f'(\mu)/n$$

$$c = f(\mu) + \mu f'(\mu)/n, \quad (8)$$

selecting n large enough to guarantee an upper bound and $\mu$ to minimize the expected or maximum gap.

(C) We fit h, c, n to give a good approximation of the resource trade-off function $f(x)$, and adjust the offset c to make an upper bound.

(D) We invert an upper bound on one resource trade-off to yield a shifted hyperbolic upper bound on the inverse resource trade-off.

$$h/x^n + c \geq f(x) \Longleftrightarrow \sqrt[n]{h}/\sqrt[n]{y-c} \geq f^{-1}(y). \quad (9)$$

As an example, for time t as a function of power p, as in Equation (1), the hyperbolic bound $t \leq h/p^n+c$ can be fit by making the curves tangent at some $\mu>0$ as per Equation (8)

$$h = \frac{\gamma \mu^{n+1}}{n(1+\gamma\mu)\log(1+\gamma\mu)^2}, c = \frac{1}{\log(1+\gamma\mu)} - \frac{h}{\mu^n}.$$

For all positive p, $\mu$ and $n<1$, this hyperbolic curve is an upper bound, with an equality at $p=\mu$.

This approximation can be improved by selecting $0<n<1$. However, the resulting hyperbolic curve may be an upper bound only in some finite interval around $\mu$. We can select the point of tangency $\mu$ to minimize the expected approximation error with respect to some distribution on power costs.

For example, consider the expected additive error $\int (h/p^n+c) - 1/\log(1+\gamma p) dPr(p),$ where h, c are defined as above and Pr(p) is an exponential density function with mean $\lambda$. This integral does not converge, but its derivative with respect to $\mu$ has a single zero on $0<\mu<\infty$, at $$\mu = \lambda \sqrt[n]{(e^{-p_0/\lambda} - e^{-p_1/\lambda})/(\Gamma(1-n, p_0/\lambda) - \Gamma(1-n, p_1/\lambda))},$$

assuming some finite operating range $p \in [p_0, p_1]$. In a typical operating regime $(\gamma p \in [4,100]$ SNR.

distributed exponentially with mean $\lambda=10$. The additive error is minimized at $\mu \approx 0.95\lambda$, at $n=1$ and $\mu \approx 0.99\lambda$ at $n=\frac{3}{4}$.

Bounds on maximal and expected error follow algebraically. Less formally, by simply setting $\mu=\lambda$ and numerically calculating the expected multiplicative error, we find that the hyperbolic bound overestimates power costs by $<2.4\%$ on average at $n=1$ and $<1.0\%$ at $n=\frac{3}{4}$.

Optimal Deterministic Allocation

With hyperbolic upper bounds $h_i/x^n{}_i+c_i \geq f_i(x_i)$, the allocation problem of Equation (5) takes the form $$\min \sum_i h_i/x_i^n + c_i \text{ s.t. } \sum_i x_i \leq B, \forall_i \, x_i > 0. \quad (10)$$

Without loss of generality, we drop the fixed $$\sum_i c_i$$

and upgrade the simplex constraint to be equality at $$\sum_i x_i = B.$$

We solve this in closed form as follows.

Hyperbolic Programs

The problem $$\min \sum_i h_i/x_i^n \text{ s.t. } \sum_i x_i^m = B, \forall_i \, x_i > 0 \quad (11)$$

for $$n>0, m\geq 1, h_i>0, x_i\geq 0$$

has a unique solution $$x_i = \sqrt[m]{B \cdot h_i^{m/(m+n)} / \sum_k h_k^{m/(m+n)}} \tag{12}$$

with value $$B^{-n/m}\|h_1, h_2, \ldots\|_{m/(m+n)}$$

where $\|.\|$ is the $L_p$ quasi-norm.

For the full allocation problem as in Equation (10), the cost is upper bounded by $$B^{-n/m}\|h_1, h_2, \ldots\|_{m/(m+n)}+\|c_1, c_2, \ldots\|_1. \tag{13}$$

We assume m=1. The optimal n=1 allocation assigns $$x_i = B\sqrt{h_i} / \sum_j \sqrt{h_j}$$

of the budgeted resource to the $i^{th}$ link, and $$y_i \leq \sqrt{h_i} \sum_j \sqrt{h_j} / B + c_i$$

of the minimized resource.

It can be shown that for n=1 hyperbolic bounds on the deterministic resource trade-offs, the scale factor varies with the channel attenuation: $h_i \approx z/\gamma_i$, for some constant z. Thus, for example, to minimize power and interference with other nodes, and guarantee a delivery deadline, power and time should be apportioned according to the square root of the channel attenuation. The allocation has suboptimal bounds from the hyperbolic bounds. In this case, the expected suboptimality is <2.4%.

We provide a closed form allocation for horizontally shifted hyperbolic curves $$\min \sum_i h_i/(x_i+v_i)^n + c_i \text{ s.t. } \sum_i x_i^m = B$$

solved at $$x_i = \left(\left(B+\sum_k v_k\right)h_i^{m/(m+n)} / \sum_k h_k^{m/(m+n)} - v_i\right)^{1/m}.$$

The shift ($v_i$) allows more flexible fits to convex resource trade-off curves, but unshifted hyperbolic curves are much more versatile in the routing problem.

Dynamic and Distributed Allocation

After determining an allocation and transmitting along the route, the packet might reach the $i^{th}$ link and an discover that its channel gain has drifted. Therefore, we revise the optimal resource allocation dynamically. To do so, it is useful to propagate and update the partial sum $$S_i \doteq \sum_{j\geq i} h_j^{1/(1+n)}$$

and the remaining time-to-deadline $B_i$. If the hyperbolic scale factor for link i changes from $h_i$ to $h'_i$, for n=1, then the minimal allocation at link i changes from $$\sqrt{h_i}S_1/B_1+c_i$$

to $$(h_i'+\sqrt{h_i'}S_{i+1})/B_i+c_i.$$

This suggests a range of distributed methods, where we do not determine each $h_i$ from instantaneous measurements, but instead assume a value for each $h_i$ on the basis of historical statistic, and then update allocations dynamically as described above. This idea is described more precisely in the stochastic setting below.

Near Optimal Routing

It is possible to determine near-optimal routes with respect to our hyperbolic upper bounds. To do so, we introduce the idea of a linear multicriterion combinatorial optimization, where the objective function is a weighted average of multiple criteria. Typically, we reason about the optimum before the weighting is known. We consider the entire set of possible solutions, indexed by the weighting parameters. Here, we consider a bicriterion path cost $$C(\mathcal{P}, \lambda) \doteq \sum_{k\in edges(\mathcal{P})} w_k(\lambda)$$

where P is a path (route) and $\lambda$ is a weighting parameter that balances the two criteria to determine each edge length $$w_k(\lambda)=h_k^{m/m+n}\lambda+B^{n/m}c_k.$$

This defines a bicriterion shortest path (BSP) problem that maps each source-destination path $P_i$ in the network to a line in the positive quadrant ($\lambda \geq 0$) with slope $$a_i = \sum_{k\in edges(\mathcal{P}_i)} h_k^{m/m+n},$$

and intercept $$b_i = B^{n/m} \sum_{k\in edges(\mathcal{P}_i)}^{n/m} c_k.$$

The key property is that on each line $a_i\lambda+b_i$, there is a point at $\lambda=a^{n/m}{}_i$ that indexes the nonlinear cost of the corresponding path under the optimal allocation, i.e., $$a_i\lambda + b_i \propto B^{-n/m}\|h_1, h_2, \ldots\|_{m/(m+n)} + \sum_k c_i. \tag{14}$$

We use this geometry to find the minimal hyperbolic-cost route.

Figure 3:
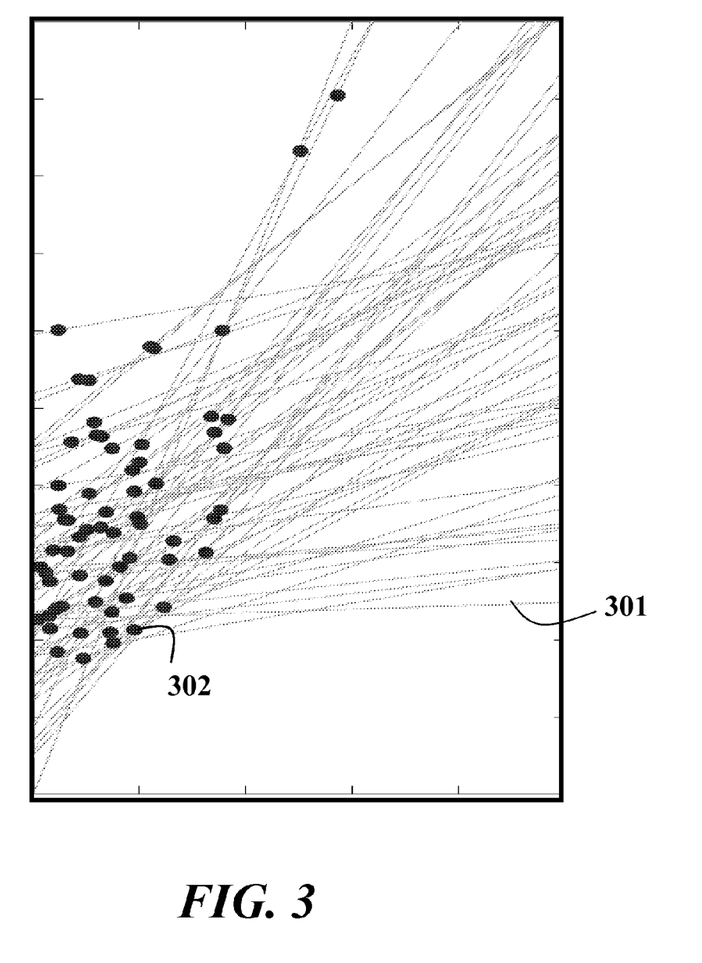
FIG. 3 is a graph of cost lines representing routes of FIG. 1 and vertical ordinates representing costs associated with the routes.

FIG. 3 shows a 'bundle' of lines 301 corresponding to possible routes. Each route has an associated cost point 302 as per Equation (14). Our solution revolves (literally) around the infimum of this bundle of lines, which is a piecewise linear concave curve called a bundle boundary, see FIG. 4.

Figure 4:
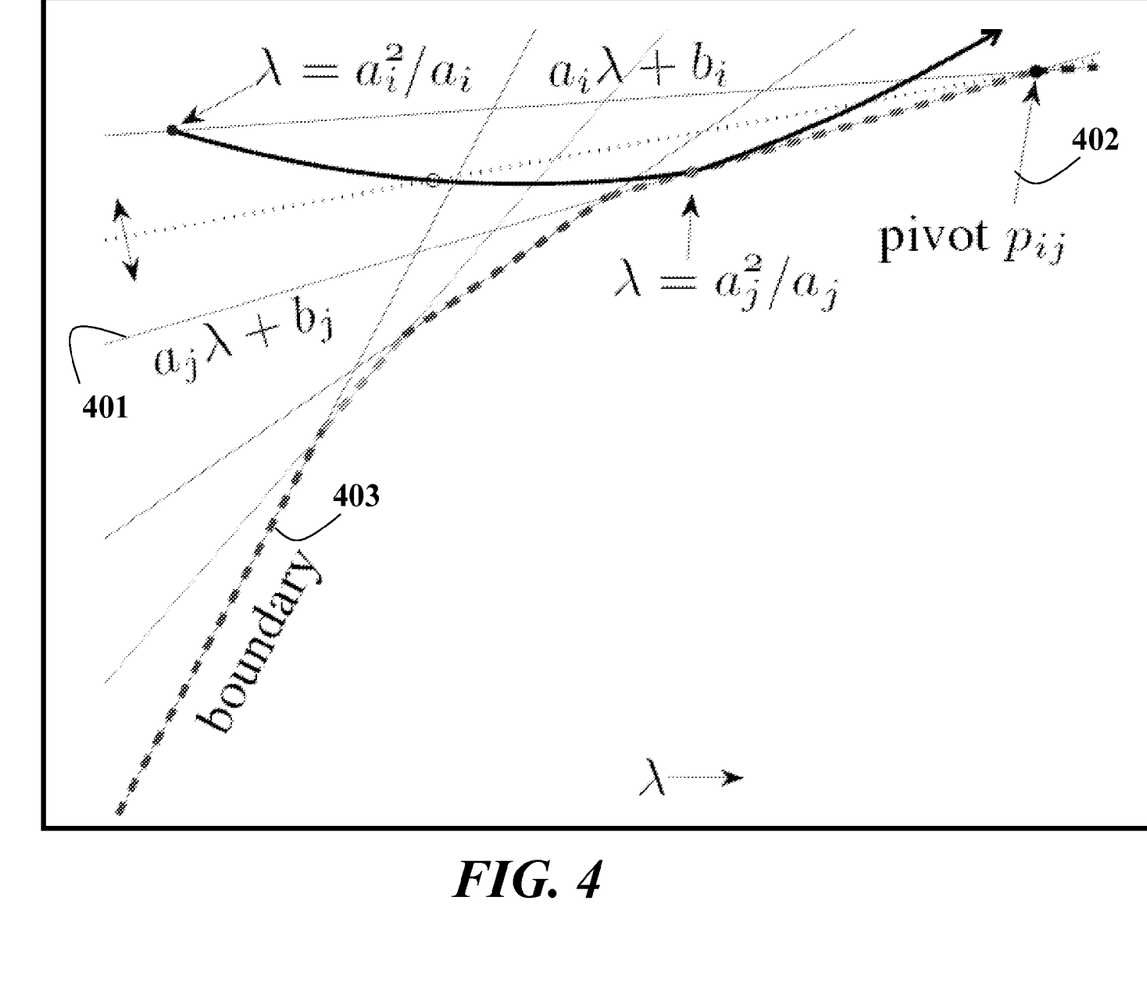
FIG. 4 is a graph of a piecewise smooth curve that is a lower bound on all costs.

The lines forming the infimum are the BSP solution set. Each line represents a shortest route on some $\lambda$-interval, and can be determined in O(M logM) time by Dijkstra's shortest path algorithm on scalar edge weights $w_i(\lambda)$ generated by an appropriate value of $\lambda$.

FIG. 4 shows the cost for constructing the nonlinear cost envelope, in the quadratic case. Each index is associated with a line of the form $l_i(\lambda)=\alpha a_i\lambda+b_i$ in the positive quadrant. The Figure shows the subset of lines that form the piecewise linear bundle boundary. The cost of each path is a point on its line at coordinate $$\lambda=a_i, l_i(a_i)=a_i^2+b_i.$$

The cost envelope is a piecewise parabolic curve formed by pivoting a line on each intersection point on the boundary, and tracing the locus of points satisfying $$\lambda=a^2/a=a$$

as the slope a of the line varies between those two envelope lines meeting at the pivot point 402. The cost envelope and boundary cost points give a lower and upper bound on the minimal possible $\min_i a_i^2+b_i$ attainable by any path in the graph. The curve of interest is formed by rolling a line $a\lambda+b$ 401 around the top of the boundary, pivoting 402 on its vertices and tracing the evolution of the point at $\lambda=a_n/m$.

For positive m, n, this curve is convex, piecewise smooth, and a lower envelope on all possible optimal cost points for any network having the same BSP boundary 403. FIG. 4 shows that this envelope connects the cost points of the boundary paths. Therefore, one of these paths is either optimal or near-optimal with the following suboptimality bounds.

Hyperbolic Min-Cost Routing

Let $P_i$, $P_j$ be two paths (routes) whose lines intersect on the bundle boundary 403 at $\lambda_{ij}=(b_j-b_i)/(a_i-a_j)$ with $a_j<a_i$. The boundary has one such pair that contains either the optimal route or a near optimal route with additive suboptimality upper-bounded by $\min_{ij}(a_i-\tfrac{1}{2}\lambda_{ij})^2$ for n=m=1, and $\min_{ij} a_i(a^{n/m}_i-\lambda_{ij})+(n/m)((m\lambda_{ij})/(m+n))^{(m+n)/n}$, for general m, n. A looser bound $((a^{n/m}_i-a^{n/m}_j)/2)^{(m+n)/n}$ yields an n=m=1 suboptimality ratio $$\frac{a_i^2+b_i}{(3a_i-a_j)(a_i+a_j)/4+b_i}.$$

Note that the population of boundary lines grows at least polynomially with the number of edges. Thus, suboptimality vanishes asymptotically with graph size. The BSP solution set can be explicitly enumerated and scanned for the best path, with polynomial smoothed time complexity. However, because the envelope can be characterized parametrically and differentiated, we can perform a bisection search on the slopes of the boundary lines to find the boundary path and index having a lowest nonlinear cost, using envelope derivatives to decide the correct bisection interval.

Stochastic Methods

Now, we describe probabilistic resource trade-offs. As stated above, the subexponential nature of the distributions of the optimization variables precludes analytic approaches. We prefer lower-bounding the probability of success with a more tractable set of linearly additive phase-type distributions. There are several possibilities. We use gamma distributions with a common spread parameter $\beta$ and varied location parameters $\alpha_i$; e.g., if $X_1\sim\text{Gamma}(\alpha_1\beta)$, and $X_2\sim\text{Gamma}(\alpha_2\beta)$ then $X_1+X_2\sim\text{Gamma}(\alpha_1+\alpha_2,\beta)$.

For each link, we assume a finite operating range and select a parameterized bounding distribution that is dominated by the true distribution on that interval, e.g., $\forall_{t_{min}<t<t_{max}} \text{Pr}_{bounding}(X_i \leq t|y_i,\alpha_i) \leq \text{Pr}_{true}(X_i \leq t|y_i)$.

Then, any reasoning done with the bounding distributions underestimates the true probability of success. For example, when minimizing power subject to time constraints, we can conservatively select $t_{max}$ to be the full time budget and $t_{min}$ to be the shortest single-link transmission time attainable at maximal power. That makes the set of successful events a subset of the set of events for which the bound is valid.

Because the true distribution is subexponentially heavy-tailed, there is some crossing point $t_c>0$ below which the true distribution dominates. Setting the two CDFs equal at $t_c=t_{max}$ guarantees the validity of the bound over the operating range while determining a convex functional relationship $\alpha_i=g_i(y_i)$ between resource use $y_i$ and the parameter $\alpha_i$ of the bounding CDF.

Generally, increasing resource use $y_i$ decreases parameter $\alpha_i$, which in turn increases the probability $\text{Pr}(X_i\leq t)$. Given any fixed resource allocation $y_1, y_2, y_3, \ldots$, over the entire network and linearly additive bounding distributions, the min-cost route on edge costs $\alpha_i=g_i(y_i)$ maximizes the lower bound on probability of success.

Resource Allocation on a Fixed Route

We consider the allocation problem on a route with stochastic resource trade-offs. The linkwise bounding distributions are constructed so that for any route of links, there is a distribution $$G_\beta(A, B) \doteq Pr_{X\sim\text{Gamma}(A,\beta)}(X \leq B),$$

which, for $$A \geq \sum_i \alpha_i,$$

lower-bounds e true probability of success on that route, i.e., $$Pr_{true}\left(\sum_i X_i \leq B\right) \geq G_\beta(A, B)$$

for $B\leq t_{max}$ (at least).

To obtain a specific probability of success q, we set $$G_\beta\left(\sum_i \alpha_i, B\right) = q$$

and invert $G^\beta$ on its first parameter to obtain a new constraint $$\sum_i \alpha_i \leq A = G^{-1}\beta$$

(q, B). Because resource use can also be expressed in terms of $\alpha_i$ as $y_i=g^{-1}(\alpha_i)$, Equation (6) can be rewritten $$\min \sum_i g_i^{-1}(\alpha_i) \quad (15)$$

$$\text{s.t.} \sum_i \alpha_i \leq G_\beta^{-1}(q, B).$$

We employ the same hyperbolic bounding schemes and optimization methods developed in the deterministic setting to solve for the optimal $\alpha_i$, and then calculate resource allocations $y_i=g_i(\alpha_i)$.

We work out the case of minimal power use, subject to a time constraint. To guarantee the lower bound on the probability of success, at each link, we set the gamma and time CDFs equal at $t=t_{max}$ and solve for the needed power $p_i$, yielding $$p_i = g_i^{-1}(\alpha_i) = \frac{1 - \exp\frac{1}{t_{max}}}{\bar{\gamma}_i \log(\Gamma(\alpha_i, t_{max}\beta)/\Gamma(\alpha_i))}.$$

A power series expansion about $\alpha_i=0$ reveals the hyperbolic approximation $$p_i = g_i^{-1}(\alpha_i) \leq \frac{h_i}{\alpha_i} + c_i \text{ for } h_i = \bar{\gamma}_i^{-1}\frac{1-\exp\frac{1}{t_{max}}}{\Gamma(0, t_{max}\beta)} \quad (16)$$

which becomes an upper bound with suitable choice of $c_i$.

With this, Equation (12) can be applied directly to Equation (15) to determine the optimal $\alpha_i$ w.r.t. the hyperbolic bounds, which in turn gives the optimal allocation $y_i$ w.r.t. the hyperbolic and gamma bounds jointly. The same construction is used to minimize time given an power constraint, except with $$t_i = g_i^{-1}(\alpha_i)$$
$$= \log(1 - \bar{\gamma}_i p_{max} \log(1 - \Gamma(\alpha_i, p_{max}\beta)/\Gamma(\alpha_i)))^{-1} \leq$$
$$\frac{h_i}{\alpha_i} + c_i \text{ for } h_i$$
$$= \bar{\gamma}_i^{-1} \frac{1}{p_{max}\Gamma(0, p_{max}\beta)}.$$

For energy given time, $g^{-1}(\alpha)$ and $h_i$ are the same as those of power given time, except multiplied by $t_{max}$. For time given energy, let $$v_i = -\bar{\gamma}_i e_{max} \log(1-\Gamma(\alpha_i, e_{max}\beta)/\Gamma(\alpha_i)).$$

Then $$e_i = g_i^{-1}(\alpha_i) \quad (17)$$
$$= \left\{\frac{-1}{v_i} - W_{-1}\left(\frac{-1}{v_i}\exp\frac{-1}{v_i}\right)\right\}^{-1} \leq$$
$$\{\log v_i + \log(1 + \log v_i)\}^{-1} \leq$$
$$\frac{h_i}{\alpha_i} + c_i \text{ for } h_i \propto \bar{\gamma}_i^{-1}.$$

There is a symmetry with $$h_i \alpha \bar{\gamma}_i^{-1}$$

in all cases under n=1 hyperbolic bounds, therefore the optimal setting of the gamma location parameters is $$\alpha_i \alpha \bar{\gamma}_i^{-1/2}.$$

However, in actual implementation, there is an asymmetry. When minimizing power, one transmits at the allocated power. When minimizing time, the transmitter and receiver exchange the current channel gain, then one transmits using whatever power is necessary to meet the allocated time constraint. If the requested probability of success is too high, then the optimal allocation puts one or more links outside of their operating range. Resource use at these links can be clamped to their maximums and the allocation problem re-solved at the remaining links. If this fails to yield a viable allocation, then we report that the desired probability of success is infeasible w.r.t. the selected bounds.

Routing

After the optimization problem in Equation (15) is hyperbolically bounded, the routing can be applied without modification to find near-optimal paths w.r.t. the gamma bounds and hyperbolic bounds.

Dynamic Allocation

Uncertainty is reduced as a multi-hop relay progresses. The probability distribution narrows and only $B_i$ of the budgeted resource remains after we have reached link i. Re-solving Equation (15) at link i gives a revised n=m=1 upper bound of $$\sqrt{h_i} \sum_{j>i} \sqrt{h_j} / G^{-1}(B_i, q).$$

If link i's probability distribution is collapsed prior to transmission, e.g., by measuring its instantaneous channel gain, then we determine the deterministic resource trade-off $y_i=f_i(x_i)$. Conditioning the probability of success on this information yields a modification of the optimization problem in Equation (15)

$$\min f_i(x_i) + \sum_{j>i} g_j^{-1}(\alpha_j) \quad 18)$$

$$\min f_i(x_i) + \sum_{j>i} g_j^{-1}(\alpha_j)$$

$$\text{s.t.} \sum_{j>i} \alpha_j \leq G^{-1}(B_i - x_i, q)$$

$$\text{s.t.} \sum_{j>i} \alpha_j \leq G^{-1}(B_i - x_i, q).$$

The nonlinear dependence of the probability of success on $x_i$ presents a difficulty. To solve with n=1 bounds, we lower-bound the probability of success with an affine function $$b - \alpha x_i \leq G^{-1}(B_i - x_i, q),$$

upper-bound the stochastic link costs $g^{-1}(\alpha_j)$ as above, and upper-bound the deterministic cost $f_i(x_i)$ with $h'_i/x_i + c'_i$ as above, and then solve the hyperbolic program $$\min h'_i/x_i + c'_i \sum_{j>i} h_j/\alpha_j + c_j$$

-continued $$\text{s.t. } \alpha_i + \sum_{j>i} \alpha_j \leq b, \; \alpha_i = ax_i$$

(19) to obtain the minimal safe expenditure at link i of $$f_i\left(ab\sqrt{h'_i} \bigg/ \left(\sqrt{h'_i} + \sum_{j>i}\sqrt{h_j}\right)\right)$$

which is a variation on the dynamic allocation described above.

Method

Figure 5:
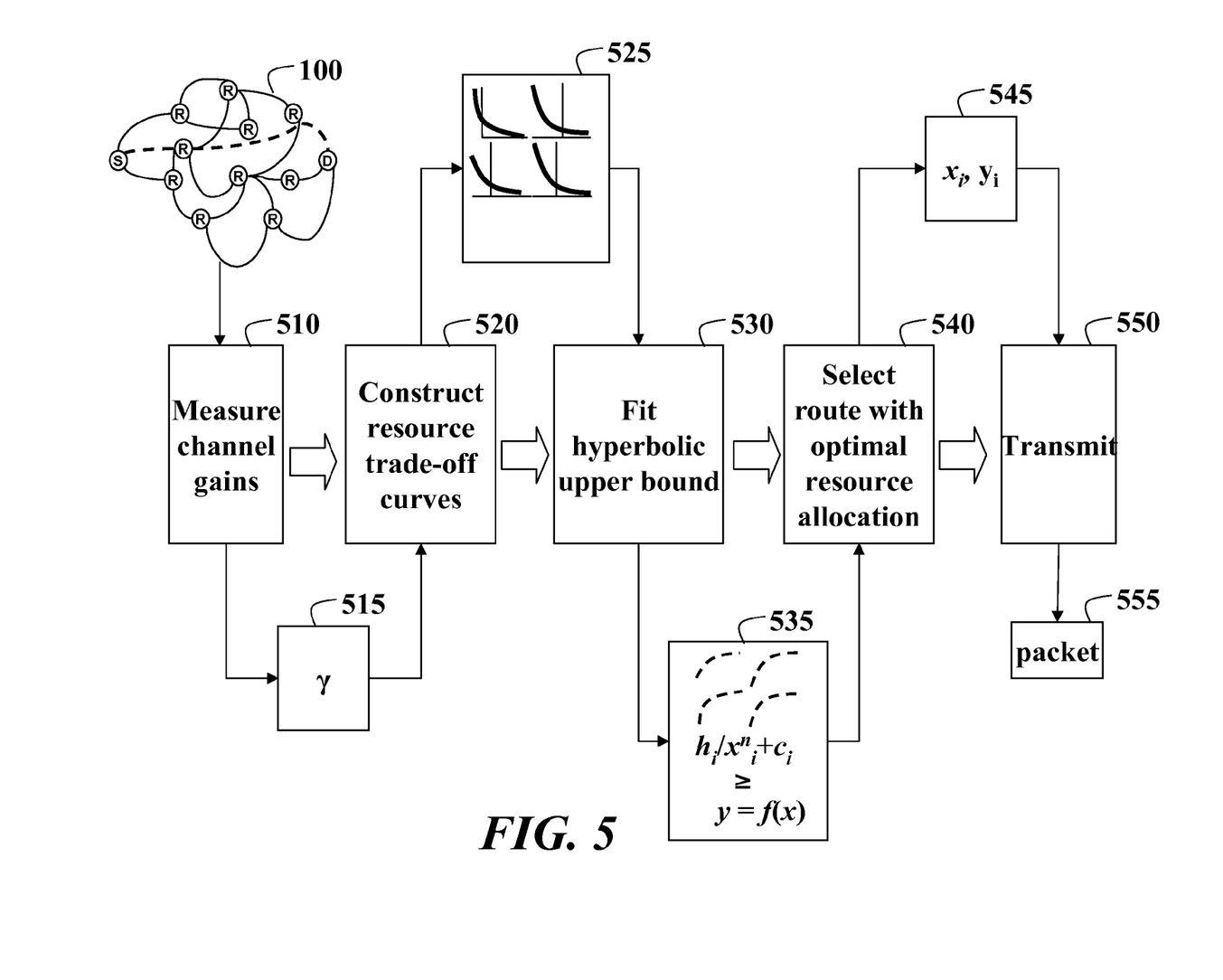
FIG. 5 is a flow diagram of a method for routing with optimal resource allocation according to embodiments of the invention.

FIG. 5 shows the general method for routing according to the invention deterministically. We measure 510 the channel gains γ 515 of the links x between the nodes in the network 100. As stated above, the gain can be an average over time. From the gains, we construct 520 the resource trade-off curves y=ƒ(x), where y is the resource and x is the link. We fit 530 hyperbolic upper bounds (h/x+c) 535 to the curves, where h is a scale factor, and c and offset for each link. We select 540 the route $x_i$ with optimal resource allocation $y_i$, and transmit 550 packets 555 accordingly.

Effect of the Invention

In the wireless network, time, power and energy resources can be traded-off with transmission time, according to channel capacity constraints, and it is desirable to optimize one resource while guaranteeing quality of service with respect to each other.

We provide a method for optimizing such resource trade-offs in combinatorial and stochastic settings. We achieve tight hyperbolic bounds and a closed form resource allocation with less than 3% expected suboptimality, dynamic re-allocations, a low-complexity combinatorial solution for finding a route with a near-optimal resource trade-off, bounds on its suboptimality, and we extend of all these methods to a stochastic setting where the resource trade-off curves are known only probabilistically.

Suitably generalized, the method is useful in any network where there is a combinatorial optimization subject to stochastic resource trade-offs and budgetary constraints.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for routing a packet from a source node, via relay nodes, to a destination node, wherein the source node, the relay nodes, and the destination node are connected by wireless links x, comprising:

measuring a channel power gain γ for each link x;

constructing resource trade-off curves y=f(x) for each link x from the channel power gains γ, wherein y represents a set of resources, wherein the set of resources includes time, power, and energy, and the resource trade-off curves include time versus power, time versus energy, power versus time, and energy versus time;

fitting a hyperbolic upper bound h/x +c to each resource curve, such that h/x +c≧f(x), wherein h is a scale factor, and c is an offset;

selecting a route with an optimal resource allocation according to the hyperbolic upper bounds on the resource trade-off curves; and transmitting a packet from the source node, via the relay nodes, to the destination node using the route.

2. The method of claim 1, wherein one of the resources in the set is minimized subject to constraints on the other two resources in the set.

3. The method of claim 1, wherein each resource trade-off curve is represented by probabilistic function.

4. The method of claim 1, wherein the channel gain is an average over time.

5. The method of claim 1, further comprising:

minimizing a total use of the set of resources, such that $$\min \sum_i f_i(x_i)$$

$$\text{such that } \sum_i x_i \leq B,$$

wherein B is a resource budget.

6. The method of claim 1, wherein the set of resources are allocated dynamically while the packet is transmitted from the source to the destination.

* * * * *